US011910122B1

(12) United States Patent
Sandofsky et al.

(10) Patent No.: US 11,910,122 B1
(45) Date of Patent: *Feb. 20, 2024

(54) SYNTHESIZING INTERMEDIARY FRAMES FOR LONG EXPOSURE IMAGES

(71) Applicant: Lux Optics Incorporated, San Mateo, CA (US)

(72) Inventors: Benjamin Keith Sandofsky, San Mateo, CA (US); Sebastiaan Anne Laurens de With, San Francisco, CA (US)

(73) Assignee: Lux Optics Incorporated, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,923

(22) Filed: Apr. 29, 2022

Related U.S. Application Data

(63) Continuation of application No. 17/313,804, filed on May 6, 2021, now Pat. No. 11,394,900.

(Continued)

(51) Int. Cl.
*G06K 9/00* (2022.01)
*H04N 5/265* (2006.01)
(Continued)

(52) U.S. Cl.
CPC .............. *H04N 5/265* (2013.01); *G06T 5/50* (2013.01); *G06T 5/70* (2024.01); *G06T 7/269* (2017.01);
(Continued)

(58) Field of Classification Search
CPC ...... H04N 5/265; H04N 23/80; H04N 5/2625; G06T 7/269; G06T 5/002; G06T 5/50;
(Continued)

(56) References Cited

U.S. PATENT DOCUMENTS 6,516,154 B1 2/2003 Parulski
9,836,484 B1 12/2017 Bialynicka-Birula
(Continued)

FOREIGN PATENT DOCUMENTS

JP 10142673 5/1998

OTHER PUBLICATIONS

Triantafyllidou, Danai, et al. "Low light video enhancement using synthetic data produced with an intermediate domain mapping." Computer Vision—ECCV 2020: 16th European Conference, Glasgow, UK, Aug. 23-28, 2020, Proceedings, Part XIII 16. Springer International Publishing, 2020. (Year: 2020).*

(Continued)

*Primary Examiner* — Jonathan S Lee
(74) *Attorney, Agent, or Firm* — Van Pelt, Yi & James LLP

(57) ABSTRACT

Techniques for synthesizing intermediary frames for long exposure images are disclosed. Video stream data, comprising a plurality of arriving frames, is received. An indication that the video stream data should be processed into a long exposure image that incorporates one or more synthesized frames is received. A set of arriving frames is used to generate at least one synthesized frame. At least one received frame is blended with the at least one generated synthesized frame to form a long exposure image. The long exposure image is provided as output.

27 Claims, 11 Drawing Sheets

Related U.S. Application Data

(60) Provisional application No. 63/021,623, filed on May 7, 2020.

(51) Int. Cl.
  *G06T 7/269* (2017.01)
  *G06T 5/50* (2006.01)
  *H04N 5/262* (2006.01)
  *H04N 23/80* (2023.01)

(52) U.S. Cl.
  CPC .......... *H04N 5/2625* (2013.01); *H04N 23/80* (2023.01); *G06T 2207/10016* (2013.01); *G06T 2207/20081* (2013.01); *G06T 2207/20221* (2013.01)

(58) Field of Classification Search
  CPC . G06T 2207/10016; G06T 2207/20081; G06T 2207/20221
  USPC ....................................................... 348/239
  See application file for complete search history.

(56) References Cited

U.S. PATENT DOCUMENTS

| | | |
|---|---|---|
| 2007/0177048 A1 | 8/2007 | Van Dyke |
| 2008/0143840 A1 | 6/2008 | Corkum |
| 2008/0253758 A1 | 10/2008 | Yap |
| 2009/0086074 A1 | 4/2009 | Li |
| 2011/0016476 A1 | 1/2011 | Raju |
| 2011/0134290 A1 | 6/2011 | Park |
| 2012/0249844 A1 | 10/2012 | Saito |
| 2013/0194457 A1 | 8/2013 | Tanaka |
| 2014/0111670 A1 | 4/2014 | Lord |
| 2015/0262341 A1 | 9/2015 | Nash |
| 2016/0112637 A1 | 4/2016 | Laroia |
| 2016/0182839 A1 | 6/2016 | Shigeta |
| 2017/0163913 A1 | 6/2017 | Shigeta |
| 2017/0302840 A1 | 10/2017 | Hasinoff |
| 2017/0347044 A1 | 11/2017 | Douady-Pleven |
| 2018/0124343 A1 | 5/2018 | Vogelsang |
| 2018/0174343 A1 | 6/2018 | Slater |
| 2018/0234606 A1 | 8/2018 | Pohl |
| 2018/0316864 A1 | 11/2018 | Molgaard |
| 2019/0182434 A1 | 6/2019 | Moon |
| 2019/0370948 A1 | 12/2019 | Tico |
| 2020/0106945 A1 | 4/2020 | Hsieh |
| 2022/0007040 A1 | 1/2022 | Ward |

OTHER PUBLICATIONS

Brooks, Tim, and Jonathan T. Barron. "Learning to synthesize motion blur." Proceedings of the IEEE/CVF Conference on Computer Vision and Pattern Recognition. 2019. (Year: 2019).*

Hasinoff et al., Burst Photography for High Dynamic Range and Low-Light Imaging on Mobile Cameras, SA '16 Technical Papers, Dec. 2016.

Jiang et al., Super SloMo: High Quality Estimation of Multiple Intermediate Frames for Video Interpolation, Proceedings of the IEEE Conference on Computer Vision and Pattern Recognition, 2018.

JPH10142673A; Ito Naoki; Camera Display Device; Asahi Optical Co Ltd; English Translation; May 1998; pp. 2-6 (Year. 1998).

Nobuyoshi Terashima, 12—Computer Vision, Intelligent Communication Systems, 2002, pp. 149-179, Academic Press, https://doi.org/10.1016/13978-012685351-3/50013-5. (https://www.sciencedirect.com/science/article/pii/B9780126853513500135).

Salamon et al., ShutterApp: Spatio-temporal Exposure Control for Videos, Computer Graphics Forum, 2019, vol. 38, No. 7.

* cited by examiner

SYNTHESIZING INTERMEDIARY FRAMES FOR LONG EXPOSURE IMAGES

CROSS REFERENCE TO OTHER APPLICATIONS

This application is a continuation of U.S. patent application Ser. No. 17/313,804 entitled SYNTHESIZING INTERMEDIARY FRAMES FOR LONG EXPOSURE IMAGES filed May 6, 2021 which is incorporated herein by reference for all purposes, which claims priority to U.S. Provisional Patent Application No. 63/021,623 entitled GENERATING LONG EXPOSURE IMAGES filed May 7, 2020 which is incorporated herein by reference for all purposes.

BACKGROUND OF THE INVENTION

Images are increasingly taken via multipurpose mobile or other devices (e.g., smart phones) as contrasted with traditional, dedicated photographic equipment. One reason for this shift in usage is that mobile devices are virtually ubiquitous (with photographers likely always having such a device available). Another reason is that, as sensor and other technology has improved, the image quality of such devices is now generally considered to rival images captured using traditional photographic equipment. Unfortunately, certain types of photographic subjects/images are easier to capture using traditional photographic equipment.

BRIEF DESCRIPTION OF THE DRAWINGS

Various embodiments of the invention are disclosed in the following detailed description and the accompanying drawings.

DETAILED DESCRIPTION

Figure 1:
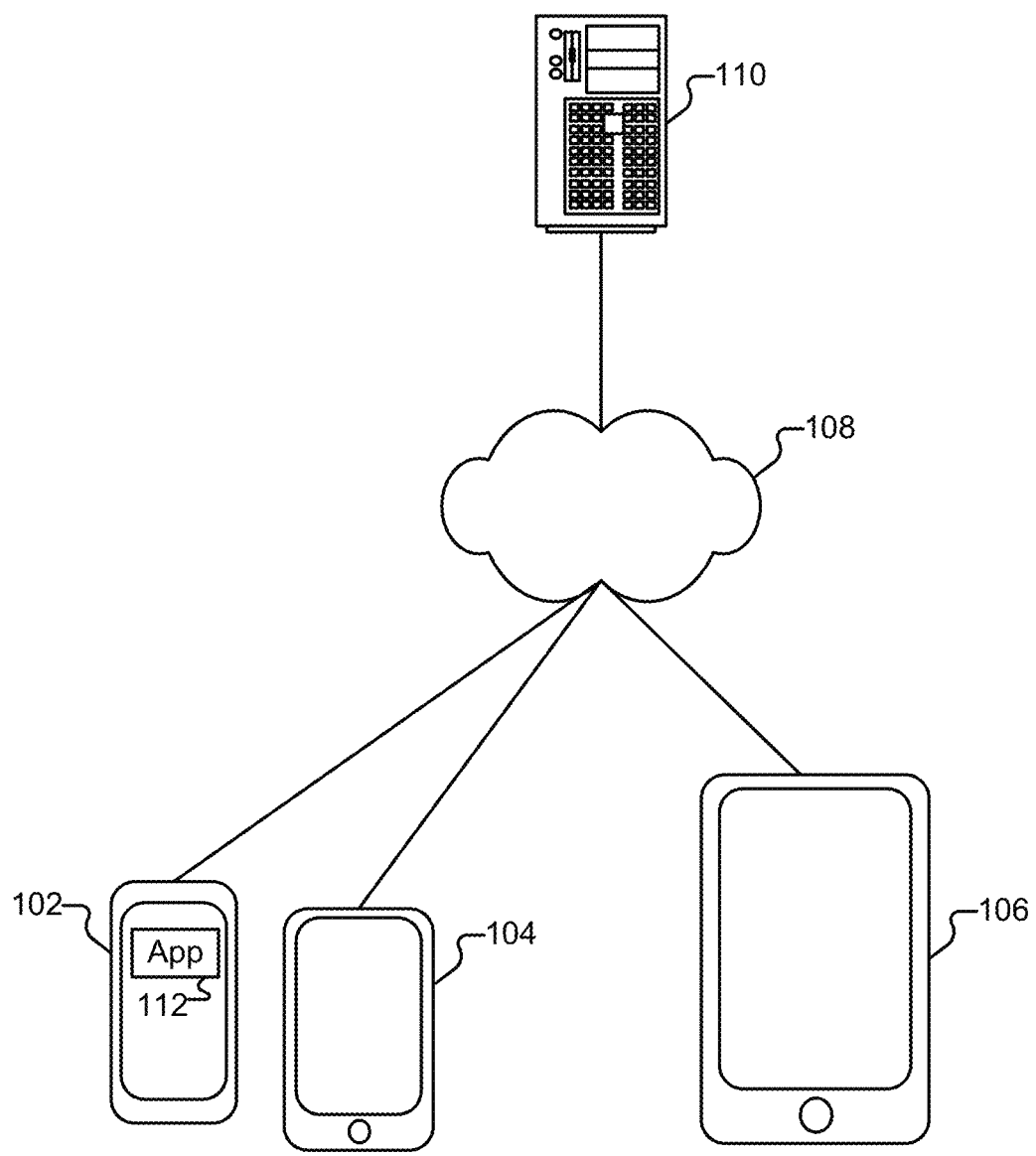
FIG. 1 illustrates an example of an environment in which a variety of mobile devices are configured to create long exposure images.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Introduction

Often, when a photographer takes a photograph, the intent is to capture sharp subject details (and freeze any motion occurring in the scene). In order to achieve such a result (e.g., under typical daylight lighting conditions), a short exposure (e.g., $1/30^{th}$ or $1/100^{th}$ of a second) is used. Photographs captured over longer periods (e.g., multiple seconds or longer) are often referred to as "long exposure" photographs.

Long exposure photography can be desirable in a variety of contexts for a variety of reasons, including for practical and artistic effect purposes. In contrast with freezing action (e.g., capturing individual water droplets, pinpointing stars, or preserving athletic moments using a fast exposure), a photographer may instead wish to emphasize the movement of a subject (e.g., photographing a smooth flow of water or trail of stars) through the deliberate use of a blurring effect provided by a longer exposure. Another example use of long exposure photography is as a practical tool. The presence of unwanted transient elements in a scene (such as a stray car or person) can be mitigated through use of long exposure photography. Similarly, a better quality image (e.g., having less noise) can be obtained when pairing a longer exposure at a lower ISO setting than a faster exposure with a higher ISO setting.

One challenge in performing long exposure photography lies in holding the camera as still as possible during the exposure. Holding a camera still for $1/30^{th}$ or $1/100^{th}$ of a second is a relatively straightforward task for most individuals. Unfortunately, even for steady-handed individuals, small involuntary muscle movements are likely to occur during multi-second exposures that will cause unwanted camera motion during exposure. Traditionally, photographers have made use of clamps, tripods, and/or other physical mechanisms to help hold their cameras steady during a long exposure. In an increasingly mobile world, however, carrying around such additional equipment can be cumbersome and/or impractical. Described herein are techniques for creating long exposure imagery, including by an end user handholding a mobile device, which do not depend on the use of tripods or similar extraneous equipment (e.g., mounts).

The techniques described herein can be performed in real-time (i.e., as the scene is optically captured, as contrasted with photo manipulation techniques which operate on previously captured images). Further, feedback can be provided to the user, in real-time, during optical capture. The following are three example scenarios in which example end users may wish to engage in long exposure photography using commodity mobile devices. In each of the scenarios, the user may wish to capture a particular subject by itself, and/or may wish to incorporate themselves (e.g., in a selfie mode). Techniques described herein can also be used in other scenarios as well (e.g., to minimize noise in low light situations).

Scenario 1: Water Features

A user may wish to photograph a water feature (e.g., a fountain, waterfall, stream, etc.). Using techniques described herein, the user can create an image in which moving water appears as silky smooth.

Scenario 2: Minimizing Unwanted Transient Elements

A user visiting a popular tourist destination may wish to photograph a landmark (e.g., a statue or building). Using techniques described herein, the user can create an image that mitigates the presence of unwanted elements (e.g., other tourists, car traffic, etc.) obstructing the view of the landmark.

Scenario 3: Light Trails

A user may wish to create artistic images that incorporate fireworks, city lights, automotive lights, etc. Using techniques described herein, the user can create such images.

II. Example Environment and Mobile Device Embodiments

FIG. 1 illustrates an example of an environment in which a variety of mobile devices are configured to create long exposure images. As shown, client devices 102 and 104 are mobile telephony devices, and client device 106 is a tablet computing device. Each of client devices 102-106 executes an applicable operating system (e.g., Android or iOS) and facilitates imagery capture/creation via one or more on-device cameras. The techniques described herein can also be used in conjunction with other types of devices, such as gaming consoles, augmented reality devices, quadcopters/drones, observational systems, etc.

Image capture techniques described herein can be incorporated into client devices 102-106 in a variety of ways, including as native functionality and/or through the use of one or more third-party applications or application components (e.g., as obtainable via an applicable network such as network 108 from an applicable repository (e.g., app store 110, examples of which include Google Play, iOS App Store, Windows Store, and Amazon Appstore)).

Figure 2A:
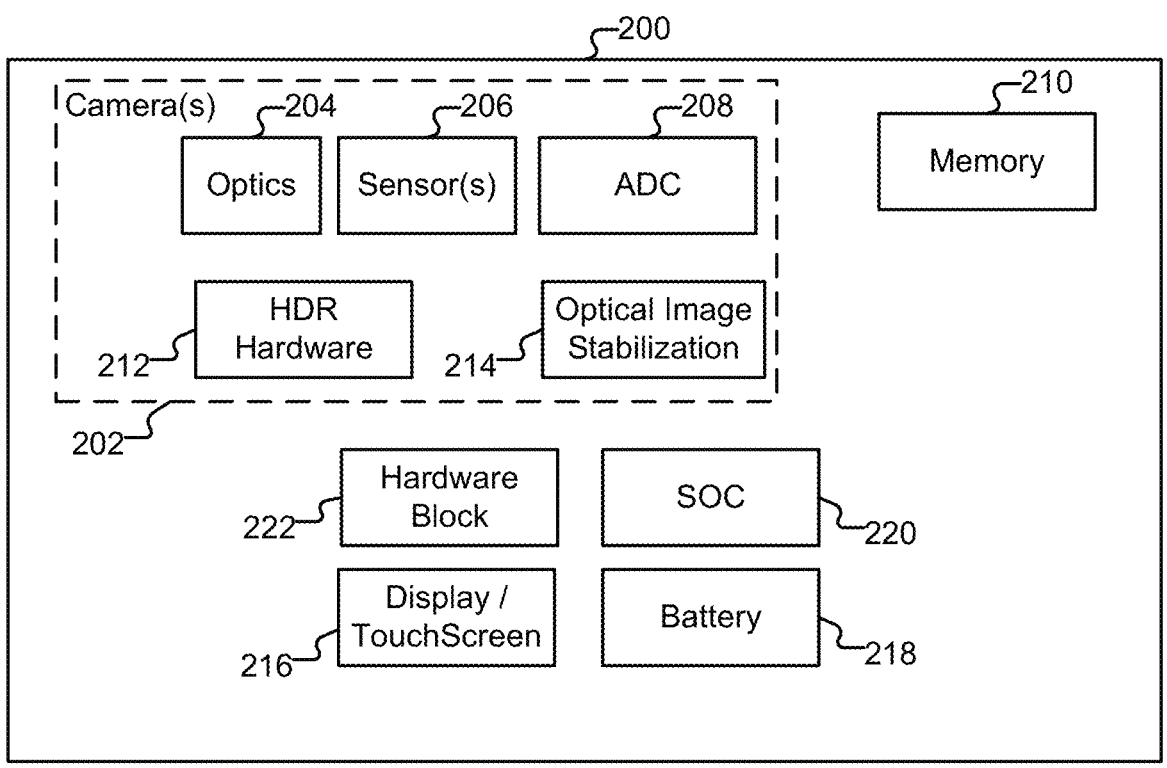
FIG. 2A illustrates example physical components that can be included in embodiments of a device that can be used in accordance with long exposure techniques described herein.

FIG. 2A illustrates example physical components that can be included in embodiments of a device that can be used in accordance with long exposure techniques described herein. Mobile device 200 includes a set of one or more cameras 202 which can comprise respective optics 204 (e.g., camera lenses), sensors 206, analog-to-digital converters 208, etc., in various embodiments. Due to hardware and other constraints (e.g., physical size, safety, and/or waterproofing considerations), camera 202 is limited in its ability to take exposures of up to four seconds. And, some embodiments of camera 202 may only support shorter exposures (e.g., of up to two seconds, or shorter). This is contrasted with traditional photographic equipment which often supports exposures of 30 seconds and longer.

In various embodiments, mobile device 200 includes additional hardware that can be used during the capture of imagery. Examples include HDR hardware 212 and optical image stabilization module 214, which may be present as additional components of cameras 202 and/or may be incorporated into other modules of mobile device 200 (e.g., as part of a system on chip 220 which can also incorporate CPU/GPU/RAM, etc.). Such additional hardware can be leveraged by techniques described herein (e.g., if present on a mobile device) but need not be provided by a mobile device in order to take advantage of techniques described herein. Additional hardware components that are included in embodiments of mobile device 200 include a touch screen 216 and one or more batteries 218.

Imagery captured by camera 202 is provided to memory 210 which is managed by device 200's operating system and mapped to buffers that are handled through frameworks (and can be accessed by application calls, etc., as applicable). Memory 210 can be included within camera 202, provided by SOC 220, or otherwise provided on mobile device 200, including as multiple memories (e.g., due to optimizations). Hardware block 222 can perform real-time image subsampling, e.g., for real-time encoding.

Figure 2B:
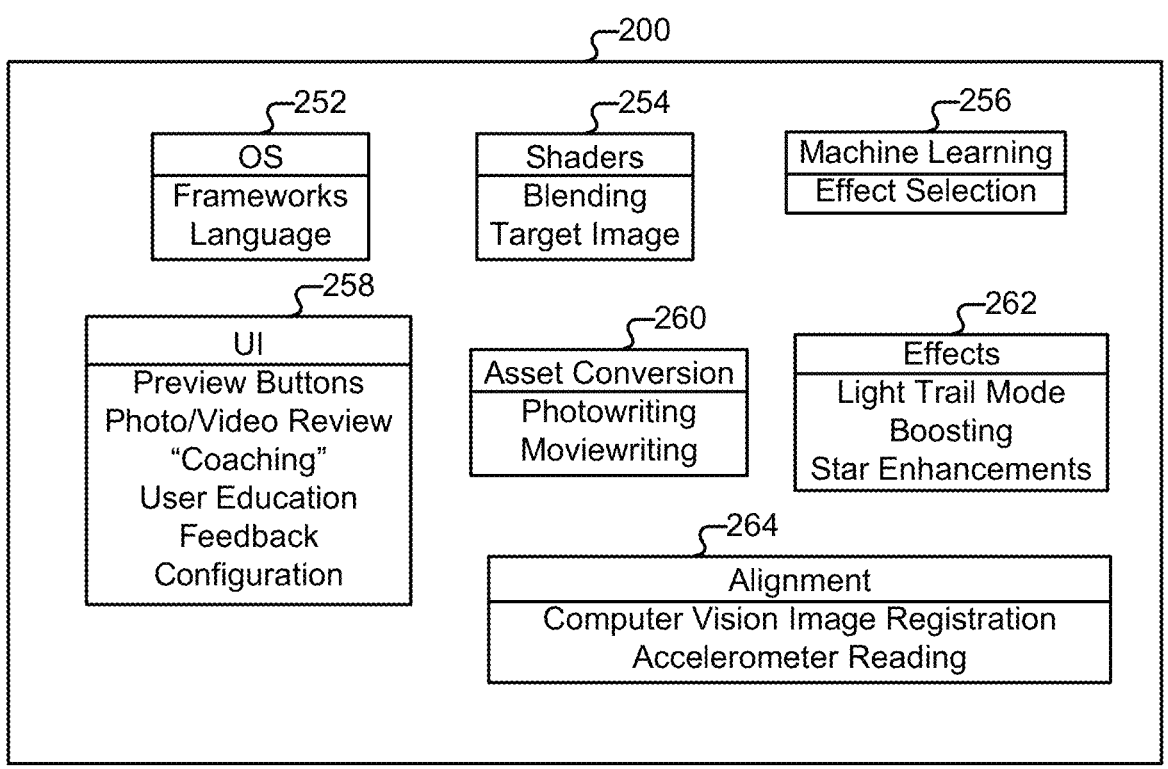
FIG. 2B illustrates example functional/logical components that can be included in embodiments of a device that can be used in accordance with long exposure techniques described herein.

FIG. 2B illustrates example functional/logical components that can be included in embodiments of a device that can be used in accordance with long exposure techniques described herein. Such components of mobile device 200 are generally implementable in a variety of ways, including as a set of one or more scripts (e.g., written in Java, python, etc., as applicable), libraries, application programming interfaces (APIs), modules, etc. Mobile device 200's operating system 252 (e.g., iOS or Android) makes available a set of frameworks which provide for use of/access to various functionality provided by hardware components of mobile device 200. GPU shaders 254 can be written to communicate with such frameworks. Such shaders can be used to generate photographs and also to provide real-time renderings (e.g., via display 216) for preview during photograph creation. Asset conversion system 260 provides functionality for reading and writing photo and movie media and for converting assets. Alignment component 264 provides functionality (e.g., computer vision image registration and/or motion sensor readings) for aligning image frames with a registration image and also providing motion feedback. User interface module 258 provides support for features such as interactive buttons, real-time image previews, user coaching tips/tutorials, etc.

Machine learning module 256 can be used to recommend particular effects/configurations (262) for capturing different kinds of long exposure images. One way to generate such recommendations is to use, as training data (e.g., for a neural network), various example images (e.g., waterfall training imagery, night sky training imagery, fireworks training imagery, selfie portraits with light trails, etc.). While executing application 112, a current context for the long exposure image to be captured can be obtained (e.g., by performing computer vision analysis on an initial frame) and compared against available models to make a recommendation. Such recommendations can include configurations (e.g., frame rate, exposure time, etc.) and artistic choices (e.g., which type of blending mode to use (e.g., averaging)), whether to apply an additional effect (e.g., boosting highlight clipped values), etc.

Functionality described herein as being performed by embodiments of mobile device 200 (e.g., when operated at the direction of an end user hereinafter referred to as "Alice") can be provided/implemented in a variety of ways. Whenever mobile device 200 is described herein as performing a task, a single component, a subset of components, or multiple components of mobile device 200 may cooperate to perform the task. Similarly, whenever a component of mobile device 200 is described herein as performing a task, a subcomponent may perform the task and/or the component may perform the task in conjunction with other components. Further, mobile device 200 can take a variety of forms and, depending on specific implementation, various components and/or features of device 102 may be omitted, provided by other components, and/or and the techniques described herein adapted accordingly. Similarly, additional components/features (not depicted in FIGS. 2A/2B) can be included in embodiments of mobile device 200 as applicable.

III. Multi-Phase Processing

Figure 3:
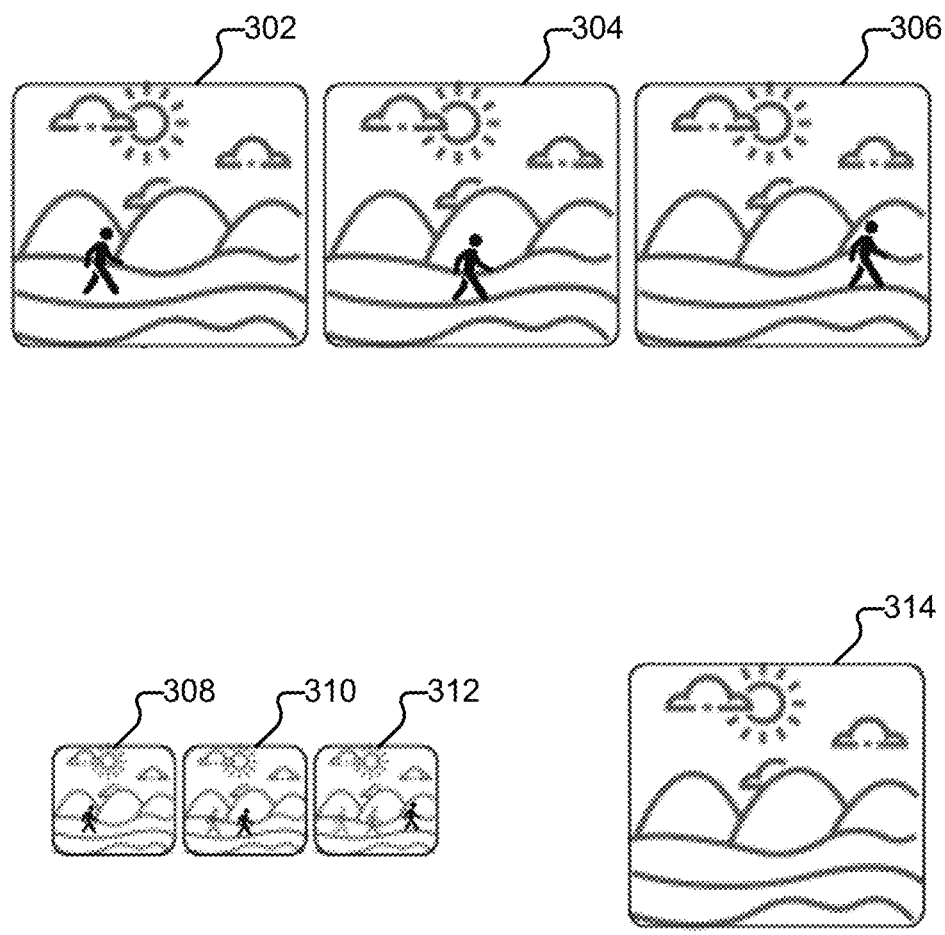
FIG. 3 illustrates the assembly of a set of frames into a long exposure image.

As will be described in more detail below, a single long exposure image can be efficiently created, in real-time, from a series of several individual images. Creation of the long exposure image can occur as a result of three processing phases, each of which can be performed in parallel (including during the capturing of image data) for efficiency. Suppose a user (Bob) would like to capture a long exposure view of a mountain scene on mobile device 104. Unfortunately, another individual (Charlie) is walking through the scene that Bob would like to capture. By blending multiple short exposures together, Bob will be able to capture the scene while minimizing Charlie's presence. A simplified example is shown in FIG. 3. A series of frames 302-306 depict the mountain scene that Bob would like to capture, as well as Charlie walking through the scene. Each of the frames represents a snapshot in time of the scene, as Charlie happens to walk through it, and can be individually processed and blended together, in real-time, into a single long exposure image. As will be described in more detail below, as each frame arrives (e.g., with frame 304 arriving after frame 302), it can be processed and blended into a result of the previously blended frames. In a simplified example, suppose only a total of three frames (frames 302-306) is captured. Region 308 depicts a blended long exposure after frame 302 has arrived and been processed. Region 310 depicts a blended long exposure after frame 304 has arrived and been processed. Region 312 depicts a blended long exposure after frame 306 has arrived and been processed. Note that in region 308 (where the blended image comprises only frame 302) Charlie is prominent, however, as additional frames are processed (e.g., as frames 304 and 306 are received and processed), Charlie's presence in the long exposure appears to ghost. In a long exposure blending frames 302-306 together, aspects common to all frames (e.g., the mountains and clouds) will appear more strongly than dynamic elements (which will fade out). Given enough frames (e.g., 90 frames instead of the example 3 frames), the presence of Charlie during filming will be mitigated (e.g., as shown in long exposure image 314 in which Charlie is effectively absent).

A. Phase 1: Image Acquisition

A single long exposure can be created from a set of many individual shots that are sharp. As an example, a single long exposure can be created from a sequence of 90 images. The specific number of shots used in forming the long exposure can vary, such as based on the type of scene (e.g., waterfall vs. star trail) and heuristics that impact the risk of shakiness. As examples, if a wider angle (e.g., 35 mm) lens is used, individual $\frac{1}{35}$ exposures may be preferable. If a narrow angle (e.g., 50 mm) lens is used, individual $\frac{1}{50}$ exposures may be preferable. Other heuristics can include motion data from the device accelerometer and performing an assessment of sharpness of previously (recently) taken photos.

One way of acquiring the set of images from which a single long exposure can be created is to make multiple (e.g., 90) "capture" calls on mobile device 200's system photography APIs. On iOS, this is the "AVCapturePhotoOutput" class, and allows for the specification of information image formats, whether to use flash, etc. Such an approach also has drawbacks, namely, it can introduce latency and resource pressure, and trying to perform a sequence of 90 capture calls could cause gaps in the imagery data.

An alternate approach to capturing a set of images from which a single long exposure can be created is to use mobile device 200's system video APIs, treating each video frame as a still photo. On iOS, this is the "AVCaptureVideoDataOuput" class. This API provides a slightly lower quality image and is more limited than the AVCapturePhotoOutput. However, it can reliably deliver a set of 30 frames per second (or more), with some mobile devices capable of capturing video at 60 FPS, 120 FPS, or faster. In general, using 30 FPS will result in the highest quality long exposure, while other frame rates may sacrifice resolution. A faster frame rate and shorter exposure time can be selected if applicable, such as where a telephoto lens is being used. For example, 60 FPS at $\frac{1}{60}$ can be used in conjunction with a long exposure that makes use of the 2× zoom lens of the iPhone X. Related to framerates is exposure time. In various embodiments, a long exposure time is selected to line up with the frame rate to ensure minimal gaps in motion between frames. As an example, at 30 frames per second, an exposure of $\frac{1}{30}$ (per second) can be used. Additional information such as the system recommended exposure can be used when determining a frame rate. Suppose the system recommended exposure is $\frac{1}{120}$ at ISO 400. The shutter speed can be adjusted to match the target frame rate of $\frac{1}{30}$, which is a change of two exposure stops. The ISO can be compensated by moving from ISO 400 to ISO 100. If hardware ISO limitations apply (e.g., mobile device 200 supports a minimum ISO of ISO 200), the shutter speed can be adjusted if needed (e.g., a shutter speed of $\frac{1}{60}$). A higher quality image (e.g., one that contains less noise) can be achieved by creating a long exposure image from multiple frames (each captured at a lower ISO) when compared to a single image captured at a faster exposure with a higher ISO.

B. Phase 2: Alignment

While each of the individual images captured during phase 1 may be sharp, a single long exposure assembled from a set of such images may appear blurry (without additional processing) due to camera movements that occur as images are captured. Over the course of a handheld long exposure, the photographer's arm will very likely have shifted (e.g., as a slow drift in a particular direction as the user's arm gets tired, or as random hand movements due to medical or other factors such as the user being on a boat).

One way such movement during capture can be mitigated is by aligning the images before blending/merging them. As an example, a "target" image from the set can be selected to serve as a reference frame, and all other images can be aligned against the target image to best overlap with it (e.g., by computing an affine transformation matrix for mapping the arriving image to the registration image, applying a plurality of transformation matrixes, etc.). Determining which image should be used as the target image can be performed in a variety of ways. As one example, the first frame that arrives after capture begins can be designated as a default target image, and all other images can be aligned using it. Other selection criteria can also be used, e.g., by allowing the user to select the target image, or by the target image being selected based on the type of scene being captured. As yet another example, the frame most level with the ground (or another applicable reference point) with a portion of frames received after the capture button has been pressed (e.g., most level frame within initial frames) can be selected. As described in more detail below, during optional post-processing, a different target image can also be selected and used retroactively (e.g., to reprocess the result into a new long exposure image).

Some embodiments of mobile device 200 will have more sophisticated hardware that can be leveraged (if available) for performing image alignment in accordance with processing performed during phase two. For example, computer vision APIs can be used to abstract away image registration techniques by determining the broad movement of the image sequence. In iOS, the system's "Vision" framework includes APIs for homographic or translational image registration, the "VNHomographicImageRegistrationRequest" and "VNTranslationalImageRegistrationRequest." Either API can be used in accordance with techniques described herein. In other devices, tools such as the OpenCV open-source framework or other appropriate frameworks can be used.

Image alignment can be a computationally expensive process. While some (e.g., higher-end, more modern) mobile devices might be able to perform alignments on all frames in real-time, some less powerful devices may not be able to keep up. This can lead to a slow experience and if enough frames are backed-up, application 112 may crash or other undesirable behavior may occur as a result. Similarly, if an incoming call is received (even on a high-end mobile device), while a long exposure image is being captured, the operating system of the mobile device may limit available resources to application 112. Operating under such reduced resources (while still capturing the long exposure) can be a more desirable option than forcing the user to re-take the photograph. In various embodiments (e.g., for use with mobile devices that are resource constrained), only some of arriving frames are aligned with the registration image. For example, the device's motion sensors can be used to detect whether significant movement has occurred between frame arrivals, and if significant movement has not occurred, the most recent alignment information can be reused (e.g., as the affine transformation matrix) rather than recomputing a new alignment. Generally, the fewer frames that are skipped during alignment, the better will be the final result. However, on very old devices, a sampling-based approach (e.g., reusing the transformation matrix of previous frame(s)) can nonetheless yield a reasonably sharp image (e.g., even where only one in six frames has a new transformation matrix computed). In some embodiments, if more than a threshold number of frames are skipped or otherwise not processed (e.g., fewer than 85% of the expected frames in a given exposure), additional frames are collected by the camera and processed until the long exposure can be completed. As an example, suppose a user intends to take a five second exposure (and such a captures is underway) but three second into the exposure, the user sneezes, resulting in period where several of the received frames (e.g., between seconds 3 and 4) cannot be successfully aligned with the reference image. If the user is able to recover from the sneeze and subsequently received frames align to the reference image within the tolerance, Application 112 can cause such additional frames to be captured and processed to complete the originally planned sequence.

Another approach to reducing the resource burden of alignment is to shrink the arriving frames to a smaller size before performing alignment. If an image is ¼ the resolution, it will have ¼ of the data to process (and take ¼ of the time). This is another tradeoff, as the alignments themselves may be less accurate. The final image (i.e., used for blending) can make use of the originally captured frames to preserve final image resolution.

C. Phase 3: Merge

In various embodiments, a GPU, which allows for massively parallel operations on pixels, is used to merge aligned images in real-time. For example, a compute shader can be used in conjunction with techniques described herein to blend images together. One potential resource constraint is the memory requirements of working with hundreds of images at once. A twelve megapixel color image requires approximately 50 megabytes of RAM. One hundred of those would be about five gigabytes. A typical commodity mobile device might have fewer than two gigabytes of memory.

One approach to mitigating RAM limitations is to use a single image buffer as a rendering target. As each new video frame in the set is captured and passed into the render pipeline, a fraction of its value is added to the buffer. As an example, if it is known in advance that the long exposure will be made up of 100 individual frames, then an approach for the compute shader is as follows:

T=Pixel in Target Image
C=Pixel in Current Video Frame
For each frame, T=T+(0.01*C)

For maximum precision when working with many floating point values, a 64-bit image can be used. A twelve megapixel image would require approximately 100 mb of memory. With a queue of a few incoming images, the system only has to use a few hundred megabytes of memory. This is much more manageable than the 5 gigabytes of a naive implementation.

Different merging techniques (also referred to herein as "blend modes") can be used for different long exposure effects, and can be based on factors such as available computing resources as applicable. An example merging technique is to create a final image as a mean (or average) of all of the pixels of each of the arriving frames' aligned pixels. Examples of blend modes include a "lighten blend" in which (in a stack of aligned images) those pixels having brighter values are preferentially used in the final image over those pixels having darker values (for a given pixel position within the image). In an alternate approach, the first frame can be used to initially fill the buffer 100%. As additional frames are received, the pixels included in those frames gradually replace the data buffer.

D. Optional Phase 4: Post Processing

One advantage to using various techniques described herein is that because the long exposure image is created on a mobile device in real-time, a real-time preview can be provided as output while frames are captured and blended, allowing the user to see how the process is going, and as applicable, make changes during capture (e.g., holding the mobile device more steady, reframing the subject during capture, etc.).

While post-processing is not necessary to perform long exposure photography using techniques described herein, for certain types of photography, the user may choose to apply additional post processing techniques (e.g., for artistic reasons). As one example, long exposure images captured using techniques described herein may comprise pixels having a more limited dynamic range than would be captured through traditional long exposure techniques. In a traditional long exposure photograph, pixels where bright light was passed through the scene will appear significantly brighter than pixels not subjected to such light. Without performing additional post processing, the brightness values of such pixels using the techniques described herein will be less noticeable (e.g., due to the averaging of clipped highlight values). Two example ways of approximating the phenomenon of traditional long exposure into a real-time digital long exposure are as follows. One solution is to keep a separate frame buffer that keeps track of the brightest pixels over every region of the image, for the duration of the long exposure process. This lighten layer can then be blended in with the long exposure generated during phase 3. This will allow the final long exposure to represent both a blended average of all of the received frames, while also preferentially preserving any particularly bright frames over those average values. Another technique is to boost the brightness of any clipped highlight pixel values obtained during phase 2. For example, if a given pixel has its RGBA values clipped (e.g., at 1.0,1.0,1.0), higher pixel values (e.g., at 2.0., 2.0., 2.0) can be used during merge (boosting the brightness values of those particular pixels during blending operations). Additional post-processing can also be performed, such as by applying a Gaussian blur to the long exposure image.

IV. Example Process

Figure 4:
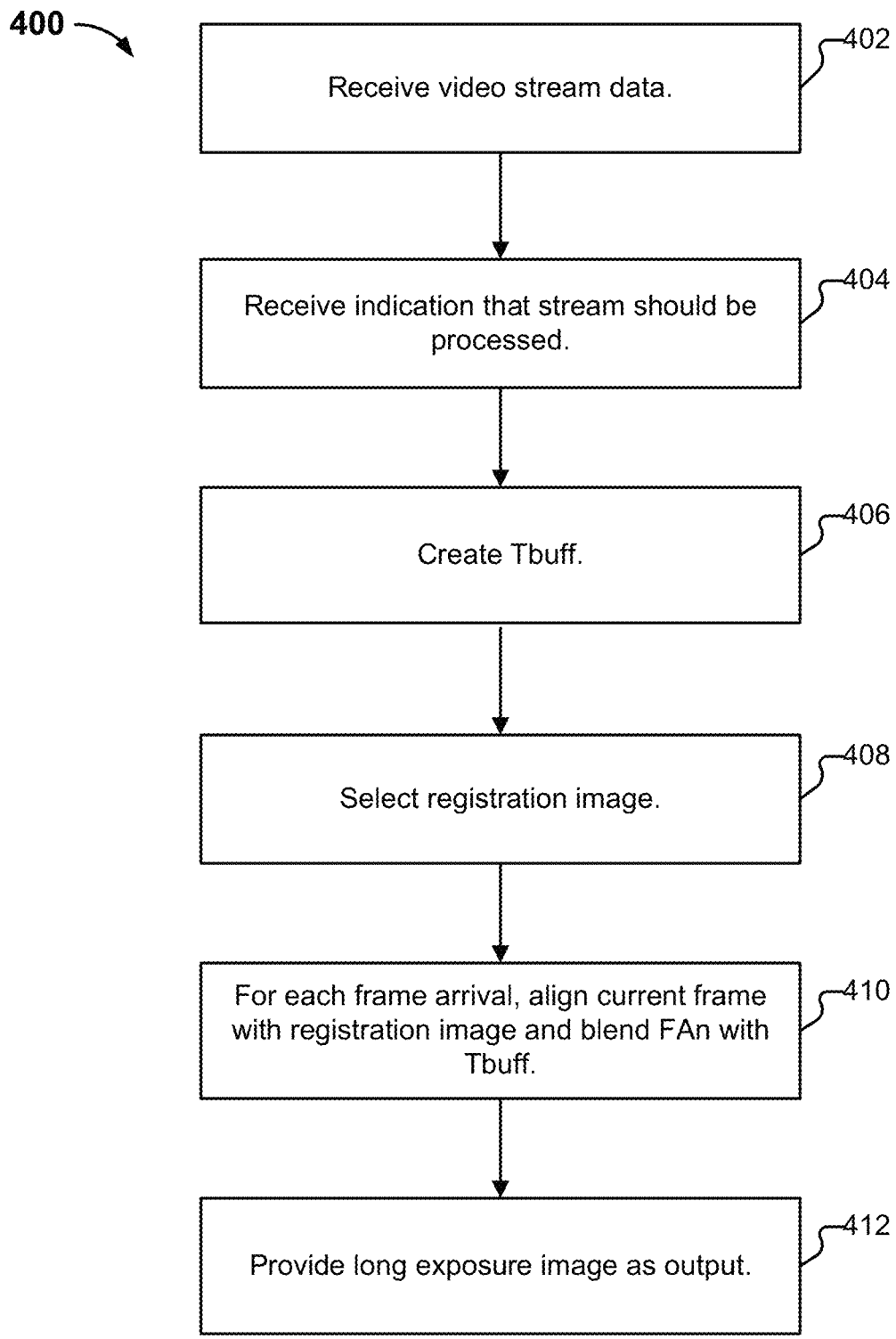
FIG. 4 illustrates an embodiment of a process for generating a long exposure image on a mobile device.

FIG. 4 illustrates an embodiment of a process for generating a long exposure image on a mobile device. In various embodiments, process 400 is performed by mobile device 102. The process begins at 402 when video stream data is received (e.g., as a constant stream of video frames which are translated into image buffers in memory).

As one example of the processing performed at 402, suppose Alice is on a hike and would like to take a long exposure photograph of a water fall in which the flowing water appears smooth. Alice opens a photography application 112 on mobile device 102, which causes camera 202 to begin making available real-time image data to application 112, including as a real-time preview image.

As applicable, an appropriate frame rate and shutter speed are selected, and a number of total frames for processing is selected. This configuration can be performed in a variety of ways. In one example, a default setting (e.g., 30 frames per second, at an exposure of $\frac{1}{30}^{th}$ of a second, for a total of three seconds, resulting in 90 frames) is selected by default for all long exposure images. The user can modify default settings if desired, such as through interacting with controls made available in a user interface. In another example, an appropriate configuration can be selected in response to the user specifying a particular type of scenario. For example, if Alice indicates that she wishes to capture a water feature, appropriate configuration settings can be selected. If Alice instead indicates that she wishes to remove tourists from a photograph of a scenic spot, an exposure of nine seconds can be selected (e.g., capturing 270 frames). If Alice indicates that she would like to capture a night scene and incorporate a light trails effect, a nine second exposure can similarly be selected during configuration and any additional buffers necessary for augmenting the light trails in the final image can be created and configured as well. In various embodiments, an appropriate configuration is automatically selected for the user based on contextual information. For example, at 402 when video stream data is received from camera 202, application 112 can infer a scene type (e.g., water scene, night scene, high contrast scene where highlight clipping compensation should be applied, etc.), such as by using computer vision analysis, and automatically select as an appropriate configuration for the scene.

At 404, an indication that the stream should be processed is received. Such an indication can be received at 404 when Alice selects a "begin capture" or similar button provided by application 112 in an interface (or interacts with mobile device 102 via a voice command). In response to receiving the indication at 404 (or at another appropriate time, such as upon the startup of application 112), mobile device 102 creates (at 406) a set of working buffers including a target video buffer ("TBuff") for the purpose of writing the final image and (e.g., if additional effects have been selected) any additional buffers that will be used in final image creation. As one example, if the user would like to apply a light trail effect, additional information about particularly bright pixels observed in the stream can be maintained in a light trail buffer (and used, e.g., in an additional blend operation with the data stored in TBuff). In this scenario, two versions of the long exposure are created in parallel during processing, a default long exposure (in TBuff) and a light trail buffer which can be blended in a final step. Maintaining multiple buffers also allows the user to see a live preview of effects, and ultimately decide whether or not they should be applied. The buffers will be used to store the first frame of the sequence, the current frame number, the target long exposure image as it is being built, and any other data that could be useful to track during the course of creating the long exposure image. Where the user is taking a selfie, a dedicated buffer can be used to maintain the frame having the sharpest facial image and blending can preferentially incorporate facial pixels (e.g., using computer vision techniques) from that buffer when generating a final long exposure image (e.g., by applying more weight to any such pixels).

At 408, a registration image is selected. As mentioned above, the registration image is used to align each of the frames used in creating the long exposure image. During capture, when a frame arrives from the camera, a check can be performed of the number of frames that have been processed so far in the long exposure. If this is the first frame since the capture started, that frame can be saved to the working buffer for alignment purposes as the registration image.

At 410, arriving frames (e.g., $Fa_1, \ldots Fa_n$) are processed in real-time. For example, at 410, they are aligned with the registration image, and blended (e.g., using GPU shaders) into the buffer.

Finally, at 412 (e.g., once the expected number of arriving frames has been processed), a long exposure image is provided as output. The output can be generated by converting the buffer contents into a JPEG, HEIC, etc., and can be written to the user's photo library using an appropriate system call/framework/etc. As mentioned above, while processing is occurring, the current state of TBuff can be displayed to the user as a preview. Further, in addition to providing a single long exposure image as output at 412, additional (optional) post processing can be performed, e.g., applying light trail or other effects. Further, in various embodiments, in addition to providing a single image as output at 412, the user can be provided with an optional movie file that links each of the frames processed at 410 into a video clip (e.g., showing the evolution of TBuff) as additional frames are captured and blended. In various embodiments, the user is provided with the option to export the individual frames and re-process them. In an example scenario, a user taking a long exposure selfie (e.g., with a waterfall in the background) may, upon review of the finished long exposure, wish to select a different registration frame (e.g., one which includes a more flattering expression). A new long exposure image can be created by repeating applicable portions of process 400.

V. Providing Feedback

The process of capturing and generating a long exposure image using techniques described herein will typically take at least a few seconds. As an example, where Alice chooses to take a long exposure image of a waterfall, capturing and processing enough frames (e.g., 90 frames) may take approximately three seconds after Alice selects a "capture image" button. Alice can be provided with a variety of feedback (e.g., via app 112) while capturing/processing is underway.

One piece of feedback that can be provided is the estimated time remaining on the creation of the long exposure. The information can be provided as a percentage (e.g., 85% complete) and can also be provided as a number of remaining frames (e.g., "completed 34 frames of 90") or in another appropriate manner.

Another piece of feedback that can be provided is a real-time preview. As more arriving frames are blended into the exposure, the current state of the long exposure can be shown (as if the long exposure had ended in that moment). This lets the user know information such as whether the image has become too blurry, or if there has been a miscalculation in the long exposure, ruining the image, during capture (e.g., allowing the user to abort the process instead of wasting additional seconds on a problematic capture). Similarly, if the user is happy with the image-in-progress, the user can elect to end processing early (e.g., ending a 9 second exposure at 4 seconds) and save the result (without bothering to capture/process the additional five seconds worth of frames).

Another type of feedback that can be provided to the user is an indication of how "shaky" the camera is. If the user's arm is moving too much (and the arriving frames are outside a threshold ability to be aligned with the registration image), then the camera will capture blurry frames which cannot be stabilized (e.g., despite use of techniques described herein). In various embodiments, application 112 provides a shakiness indicator, and encourages users by showing "STABLE" when the device is adequately stable (e.g., a threshold number of frames of the long exposure sequence are within a sufficient tolerance of the registration image). Additional information can also be provided to the user, such as suggesting the user retake the picture while attempting to be 20% more steady (e.g., by bracing the user's arm).

VI. Synthesizing Intermediary Frames

Figure 5A:
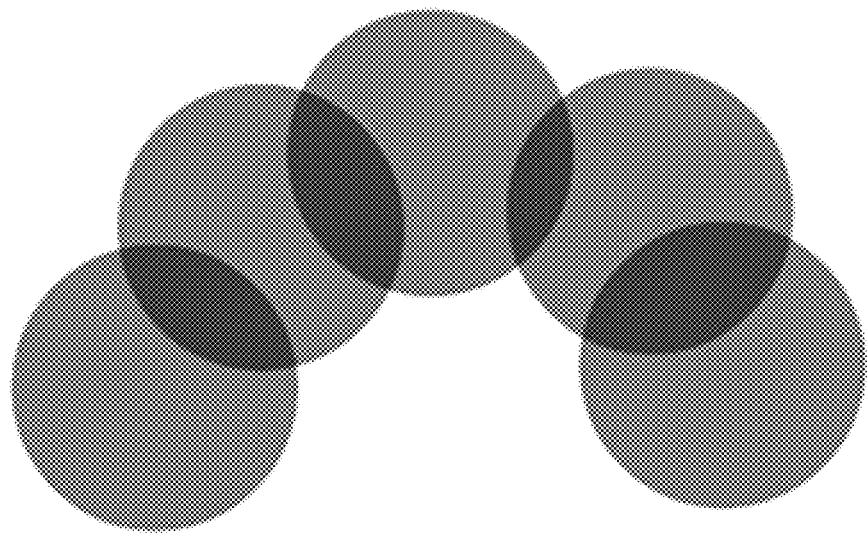
FIG. 5A illustrates an example of a long exposure image created without the use of synthetic frames.

In some scenarios (e.g., scenes with fast motion), using various of the techniques described above may result in a final long exposure image that includes unwanted (e.g., by the user) gaps. An example of this is illustrated in FIG. 5A, where a long exposure was created of a bouncing ball using techniques described above. These gaps can occur due to the capturing sensor's rolling shutter. Between each of the five frames that were used to create the long exposure, the ball moved sufficiently quickly that there was little overlap in its position between frames. An alternate reason these gaps can occur (or that worsens existing gaps) is where hardware-based HDR is used by the device. Using native iOS HDR functionality as an example, to achieve HDR, the device merges two frames for each HDR image, effectively halving the frame rate (and doubling any gaps as compared to when HDR is not used).

Figure 5B:
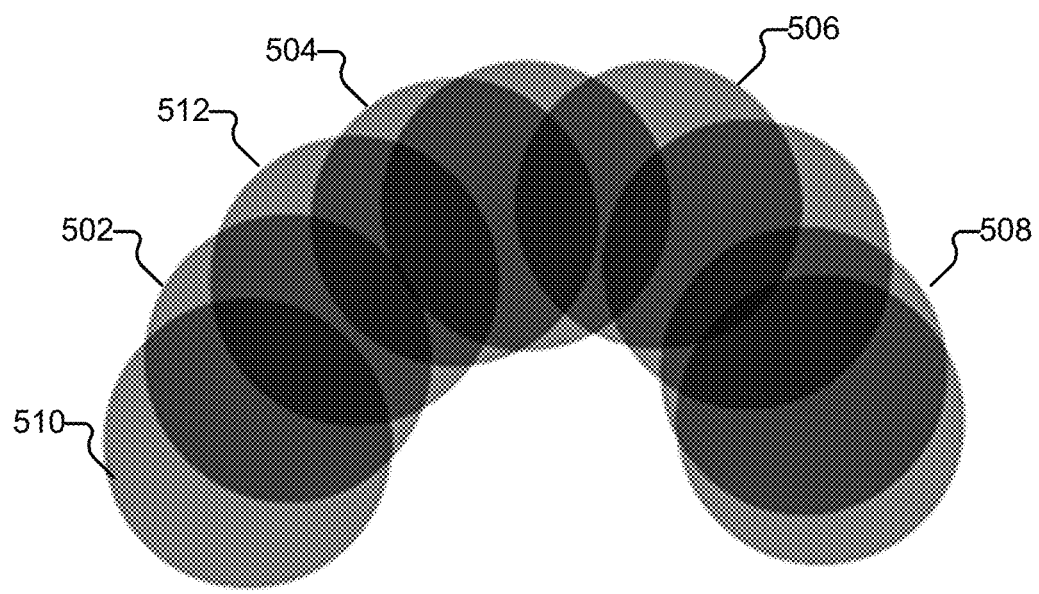
FIG. 5B illustrates an example of a long exposure image created with the use of synthetic frames.

If desired by the user, a more attractive image (e.g., one with reduced gaps) can be generated by having application 112 synthesize intermediary frames (also referred to herein interchangeably as motion interpolation). By introducing synthesized frames (e.g., into the buffer) and processing them along with the other (non-synthesized) frames, the resulting long exposure image will appear more natural/smooth. An example of a long exposure image making use of synthesized intermediary frames is illustrated in FIG. 5B. In FIG. 5B, four synthetic frames have been interposed between the five non-synthetic frames that were used to create FIG. 5A. As a result, the resulting image shown in FIG. 5B more smoothly conveys the motion of the ball (i.e., by incorporating four additional images of the ball in regions 502-508).

A variety of techniques can be used to incorporate synthetic frames into the processing of a long exposure image, which will now be described.

A. Determining Whether to Incorporate Synthesized Frames into a Particular Long Exposure As a first consideration, in various embodiments, application 112 is configured to selectively determine whether synthesized frames should be incorporated into a particular long exposure image or not. While it is possible to use the frame synthesizing techniques described herein for every long exposure image generated by application 112, it may not be desirable. Some scenes (e.g., where the user wishes to incorporate one or more prominent fast motion elements such as a moving vehicle or object) will benefit more from the inclusion of synthesized frames during processing than others (e.g., a lower motion scene such as a waterfall scene). Further, while techniques described herein are efficient and can be effectively run on a consumer-grade cellular or other device, if incorporating such frames will not represent an improvement over a long exposure that does not incorporate such frames, it could be advantageous to save processing resources (and not make use of synthetic frames).

A variety of techniques can be used in making the determination of whether or not to incorporate synthesized frames into a particular long exposure. A first approach is for application 112 to rely on a user to indicate a preference (e.g., by enabling or disabling the feature in an interface made available by application 112 where other settings are configured, such as long exposure duration). A second approach is for application 112 to make the determination, and either recommend to the user that the frame synthesis feature be turned on (or off), or automatically incorporate synthesized frames (or not). A variety of approaches can be used by application 112 to determine (without a user explicitly enabling or disabling the feature) whether to incorporate synthesized frames into a particular long exposure. Examples are as follows:

1. Heuristics

Heuristics can be used in determining that synthesized frames should be used in generating a particular long exposure image. As one example, when the user starts application 112 (or at another appropriate time, such as when the user indicates a capture should be commenced), application 112 can gather information about the scene to be captured and environmental information (e.g., lighting level, whether the device is mounted on a tripod or not, whether the accelerometer or other sensor on the device indicates the device is pointed at the sky, whether hardware HDR is turned on or not, the shutter speed, whether the exposure is set to 30 seconds or 5 seconds, etc.). The collected information can be used to prompt the user with a recommendation that the feature be turned on, or the feature can be turned on without prompting the user. In a first scenario, heuristics can be used by application 112 to determine that a user is photographing cars on a bridge landmark (e.g., using GPS information and accelerometer/compass information to determine that the user is photographing the Golden Gate Bridge) and turn on intermediary frame synthesis. In a second scenario, heuristics can be used by application 112 to determine that the user is photographing a waterfall during the daytime (e.g., using GPS information and light levels) and not turn on intermediary frame synthesis.

2. Deep Learning

Deep learning is an alternate approach that can be used by application 112 in determining whether or not to turn on the intermediary frame synthesis feature, instead of, or in conjunction with, a heuristics approach. As with the heuristics approach above, deep learning can be used to perform scenario detection. Generally, more robust scene detection can be performed using deep learning (e.g., identifying the scene as involving "cars on a bridge" or "fireworks" or a "waterfall") using computer vision techniques (e.g., provided by a framework such as the Vision framework for iOS). In some embodiments, application 112 makes use of a list of predetermined scenes for which intermediary frame synthesis would be useful. If the scene detected at startup (or capture initiation, etc.) matches one of those types of scenes (or a threshold combination of various factors observed using computer vision techniques), the feature can be turned on (or a recommendation can be made to the user that the feature be turned on). As used herein, a "set of image capture environment information" refers collectively to device-related information (e.g., GPS data, accelerometer information), as well as scene-related information that can be used in determining whether to incorporate one or more synthesized frames into a long exposure image, whether selected by a user (e.g., "I would like to photograph a waterfall"), through the use of computer vision or other frameworks (e.g., the scene is a 95% match with "fast moving car"), etc.

The list of which scenes (e.g., cars on a bridge at night) or scene components/optional heuristics (e.g., ball+outdoors or night+pointed at sky) will benefit from synthesized intermediary frames during long exposure image creation can be determined in a variety of ways as well. As one example, photography experts can curate such a list of categories. As another example, a neural network approach (or other machine learning approach) can be used to train a model using a set of example initial images (i.e., the first frame in a long exposure) labeled as benefitting from synthetic intermediary frames when processed and another example set of initial images labeled as not benefiting. The model can then be used by application 112 (e.g., in conjunction with a framework such as OpenCL for iOS) to detect (e.g., on startup or capture initiation, etc.) whether intermediary frame synthesis should be used for a particular long exposure generation. One example way of obtaining such training sets is to ask a group of users to take various long exposure images of various scenes both with and without the synthetic frame feature turned on, and ask them to indicate their preferences for or against use of the feature. The results can be pooled (and/or voting on particular images can be crowd sourced) and used as training data for the neural network.

3. Optical Flow

Figure 6A:
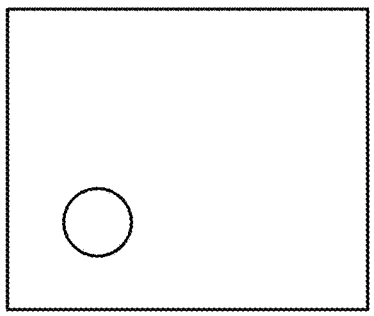
FIGS. 6A and 6B illustrate frames representing the movement of a ball.
Figure 6B:
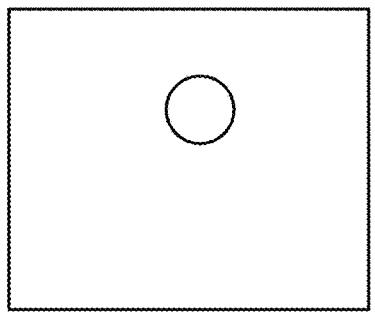
Figure 6C:
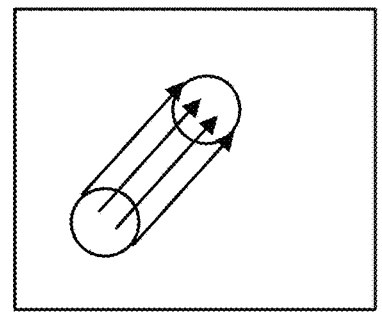
FIG. 6C illustrates an example of an optical flow field.

A third way of determining whether motion interpolation should be used when generating a long exposure image is for application 112 to make use of an optical flow field. FIGS. 6A and 6B represent two frames of a ball moving over time. Motion can be determined by examining sets of images (such as FIGS. 6A and 6B) for the movement of various feature points. The velocity of the movement, and the direction of the movement, can be represented using an optical flow field. A simple example of an optical flow field is illustrated in FIG. 6C, describing the motion of feature points between FIGS. 6A and 6B.

In various embodiments, application 112 is configured to generate an optical flow field. As one example, prior to capturing a given long exposure image, application 112 can ask the user to make a test image, where application 112 captures an initial set of frames using the video API. Application 112 can use the initial images to generate a flow (e.g., using a framework such as OpenCV) and analyze the flow to determine whether or not the scene would benefit from the use of motion interpolation.

Figure 6D:
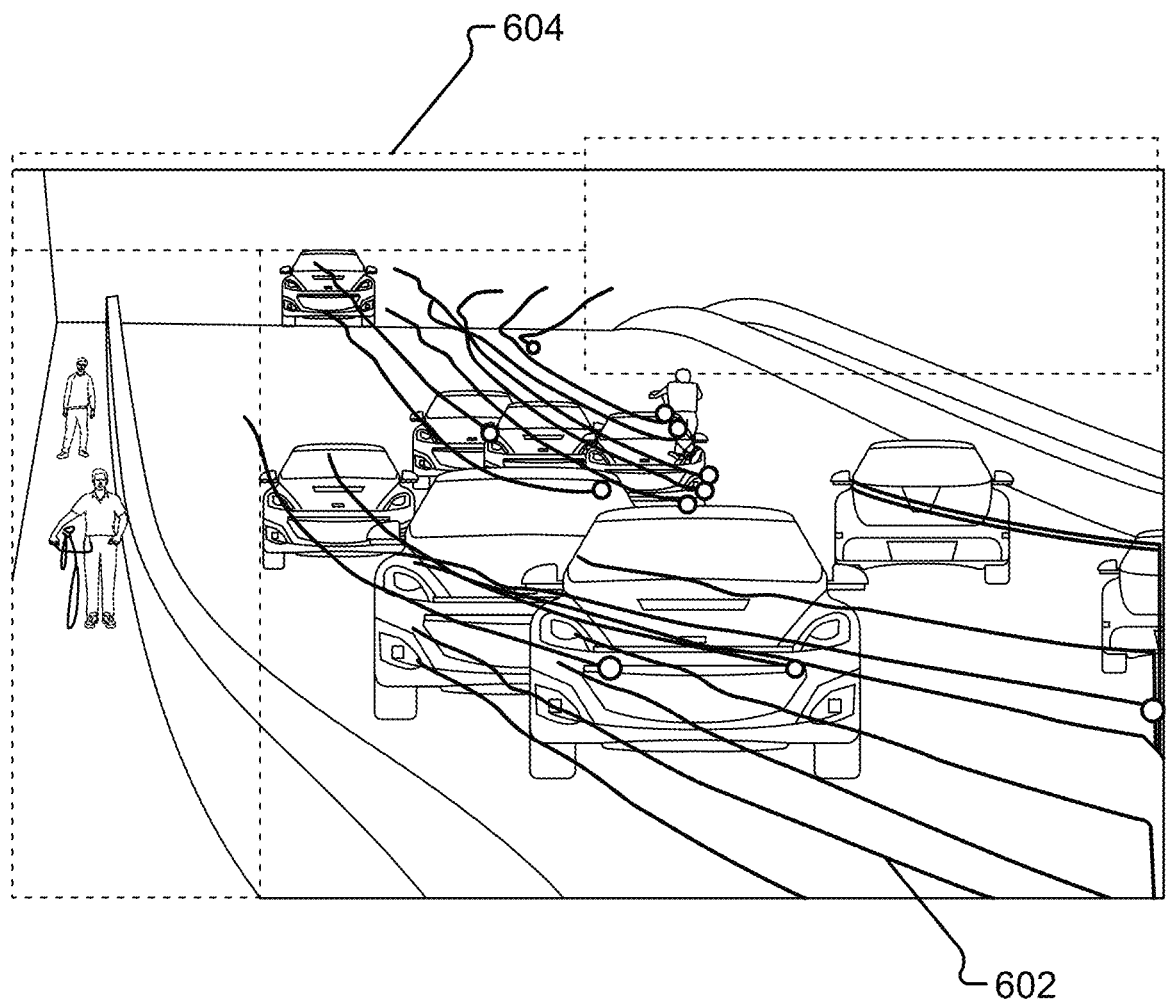
FIG. 6D illustrates an example of an optical flow.

FIG. 6D illustrates an example of an optical flow, produced by OpenCV using the Lucas-Kanade method for a sparse feature set (i.e., corners-only, using the Shi-Tomasi technique), for a scene of cars moving on a bridge. The lines (e.g., line 602) track the flow of the cars and appear, consistently, in a portion of the image. Other portions of the image are static (e.g., dotted region 604).

Figure 7A:
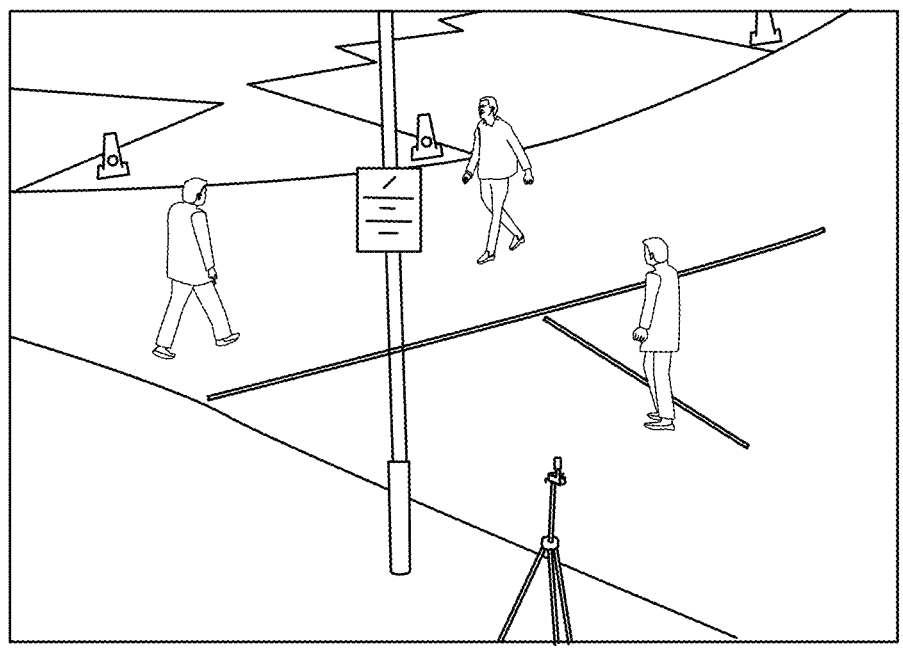
FIG. 7A illustrates an example of a scenario where individuals are walking in different directions.
Figure 7B:
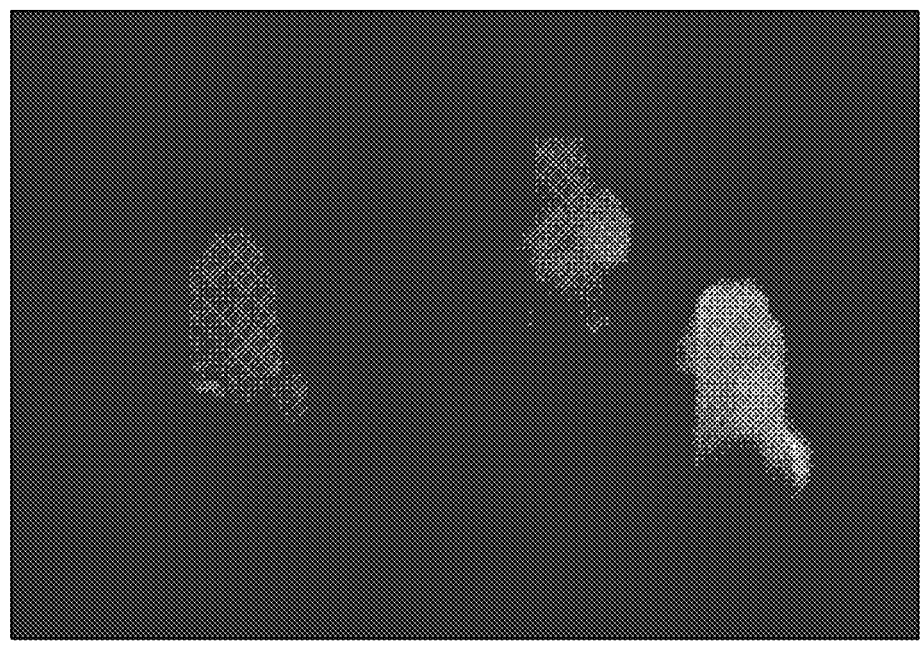
FIG. 7B illustrates an example of an optical flow field.

An alternate approach (for finding denser optical flow) is to use Gunnar Farneback's technique (also producible using OpenCV). FIG. 7A represents a scenario where three individuals are walking in different directions. Using this technique, the optical flow for every point in the frame is determined. The result (7B) is a two channel array with optical flow vectors with magnitude and direction, and can be color coded for better visualization (where direction corresponds to hue and magnitude corresponds to value). In this example, red objects (the person on the left) are heading to the upper right, green objects are moving to the lower left (the person in the middle), and blue objects (the person on the right) are heading to the upper left. Additional examples of optical flow approaches that can be used include the Horn-Schunck method, and the TV-L1 method (which lends itself well to GPUs).

If a strong optical flow is observed in specific areas of a scene over a period of time and not others (e.g., the lines depicted in FIG. 6D), application 112 can recommend that motion interpolation be used. If a weak optical flow is observed, or if optical flow is observed throughout the image, application 112 can refrain from recommending use of motion interpolation in making a long exposure image. Further, if optical flow is observed throughout the image, this can be an indication that the device is moving (e.g., the user has shaky hands or it is very windy) and an appropriate recommendation can be made (e.g., that the user brace the device).

B. Incorporating Synthetic Frames into a Long Exposure Image

Having determined that synthetic frames should be used when generating a long exposure image, a variety of ways of generating those frames can be used by application 112. A first approach is to use an optical smoothing (also referred to as motion smoothing) technique. Such techniques can readily be used, in realtime, on consumer devices (as evidenced, for example, by the inclusion of optional motion smoothing as a feature on consumer televisions). Motion smoothing techniques often rely on optical flows to interpolate frames. As one example, motion smoothing (i.e., generation of a synthetic frame) can be performed by using the optical flow shown in FIG. 6C to warp the images shown in FIGS. 6A and 6B, respectively (i.e., partially interpolate the two images using the vector fields of FIG. 6C). The result of the warping operation (an image depicting a ball in a position halfway between where it is seen in FIG. 6A and where it is seen in FIG. 6B) can be used as an intermediary frame when creating a long exposure. Returning to the example shown in FIG. 5B, an image of the ball at position 502 could be synthesized from an optical flow generated from frames that capture the ball at positions 510 and 512.

In a related approach, instead of generating an optical flow using the native resolution of the arriving frames, optical flow can be computed by analyzing a thumbnail or other reduced resolution of the received video frames. This approach can save computational resources.

Yet another approach for generating synthetic frames is to use a deep learning approach. In an example, a neural network can be trained (e.g., by a third party) using sequences of images (e.g., captured as various scenes in real life using a high frame rate camera to generate 120 frames and drop half), or automatically generated using 3D modeling software, where the neural network can learn to "guess" what an intermediary frame should look like (e.g., using the dropped frames to guide the training). The trained model can then be provided to application 112 for use in generating intermediary frames for images received in real-time from the video framework. Example ways of using deep learning techniques of optical flow (which can in turn be used to generate intermediate frames) include using the FlowNet and the RAFT architectures.

Figure 8:
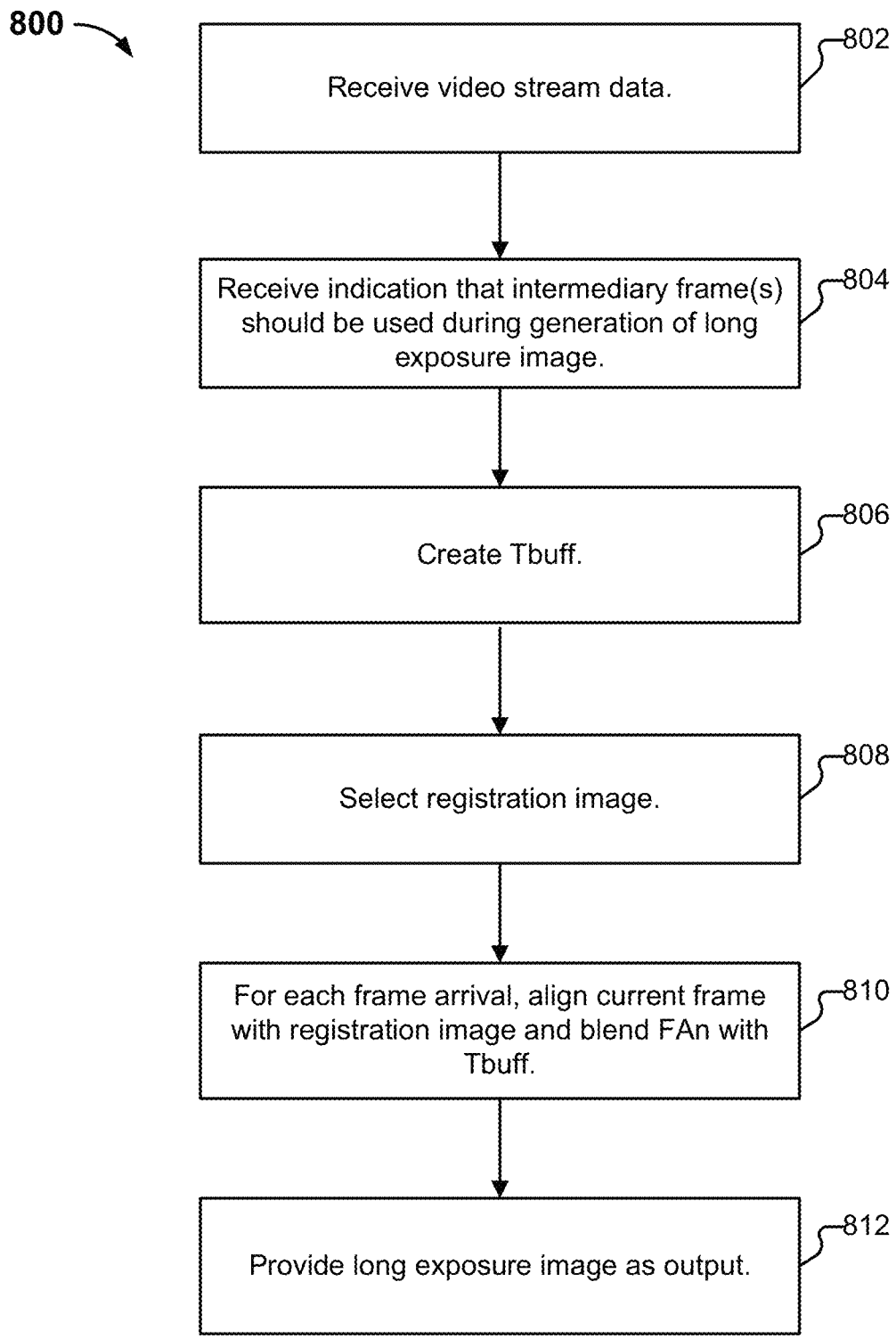
FIG. 8 illustrates an embodiment of a process for generating a long exposure image that incorporates at least one synthetic frame.

FIG. 8 illustrates an example of a process for generating a long exposure image using one or more synthesized intermediary frames (e.g., on a mobile device or other consumer device). In various embodiments, process 800 is performed by mobile device 102. Process 800 can also be performed on other devices, such as digital cameras (e.g., to prevent sensor-overheat during a very long exposure), quadcopters/drones, observational systems, etc. Further, while described in the context of a realtime video capture, in various embodiments, process 800 is performed (e.g., by application 112) on a previously captured video (e.g., as selected by a user from the user's camera roll for conversion into a long exposure).

The process begins at 802, when video stream data is received (e.g., as a constant stream of video frames which are translated into image buffers in memory). At 804, an indication that synthetic frames should be used in the processing of a long exposure image is received. As explained above, the indication can be received in a variety of ways, such as by the explicit direction of a user (e.g., selecting a button), and in response to application 112 determining that motion interpolation should be used in the creation of the current long exposure image. In various embodiments, the indication received at 804 is received prior to receipt of video stream data (i.e., steps 804 and 802, as with other steps in processes described herein, can be performed in different sequences, as applicable). As applicable, the parameters for performing the long exposure capture (e.g., number of frames to be captured and blended) can be adjusted based on the indication (e.g., increasing or decreasing the suggested number of frames to be captured or duration of the image based on whether or not the motion interpolation feature is used).

Figure 9A:
FIG. 9A illustrates an example of a long exposure image created without the use of synthetic frames.
Figure 9B:
FIG. 9B illustrates an example of a long exposure image created with the use of synthetic frames.

As with portion 406 of process 400, at 806, a set of working buffers is created. In an example implementation (and similar to the light trail example provided above), two versions of the long exposure can be created in parallel during processing: a default long exposure (in TBuff) and a synthetic frame long exposure (stored in a synthetic frame buffer that holds any generated intermediary frames during processing). The two buffers can be blended in a final step (812). Further, in this example implementation, as applicable, a user can be presented with two final images and asked to select a preferred one (whether for training purposes as described above, or otherwise): the first final long exposure image comprises only non-synthetic images (e.g., FIG. 9A where the car streaks include bumps), while the second final long exposure image blends the results of both the TBuff and synthetic frame buffer (e.g., FIG. 9B where the car streaks are smoother).

Portion 808 of process 800 corresponds to portion 408 of process 400. Portion 810 of process 800 corresponds to portion 410 of process 400, however, additional processing is performed—namely, generation of synthetic frames (e.g., using the most recently arrived video frame and its predecessor video frame) in accordance with a technique such as is described above, and insertion of the synthetic frames into the synthetic frame buffer.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a processor configured to:
  receive, in response to calling a video capture application programming interface (API) of a device, video stream data, wherein the video stream data comprises a plurality of arriving frames captured as video data during a video recording operation of the device;
  receive an indication that the received video stream data should be processed into a long exposure image that incorporates one or more synthesized frames;
  use a set of frames including at least one arriving frame to generate at least one synthesized frame, including by using a model trained based at least in part on a set of other long exposure images;
  blend at least one received frame with the at least one generated synthesized frame to form the long exposure image; and
  provide the long exposure image as output; and
 a memory communication interface coupled to the processor and configured to provide the processor with instructions.

2. The system of claim 1, wherein the plurality of arriving frames are obtained from a previously stored video file.

3. The system of claim 1, wherein the indication is received from a user.

4. The system of claim 3, wherein the indication is received in response to making a recommendation to the user that the long exposure image should incorporate the one or more synthesized frames.

5. The system of claim 1, wherein the indication is received in response to applying a set of heuristics to a set of image capture environment information.

6. The system of claim 1, wherein the indication is received in response to applying an additional trained model to a set of image capture environment information.

7. The system of claim 1, wherein the indication is received in response to a determination of a scene associated with the video stream data.

8. The system of claim 1, wherein the indication is received in response to an optical flow analysis.

9. The system of claim 8, wherein the optical flow analysis is performed using a set of reduced resolution thumbnail images.

10. The system of claim 1, wherein generating the at least one synthesized frame includes applying a video smoothing technique.

11. The system of claim 1, wherein generating the at least one synthesized frame includes using an optical flow.

12. The system of claim 1, wherein the processor is further configured to generate a recommendation to a user to employ the one or more synthesized frames in creating the long exposure image.

13. The system of claim 1, wherein the set of other long exposure images incorporate one or more other synthesized frames.

14. A method, comprising:
receiving, in response to calling a video capture application programming interface (API) of a device, video stream data, wherein the video stream data comprises a plurality of arriving frames captured as video data during a video recording operation of the device;
receiving an indication that the received video stream data should be processed into a long exposure image that incorporates one or more synthesized frames;
using a set of frames including at least one arriving frame to generate at least one synthesized frame, including by using a model trained based at least in part on a set of other long exposure images;
blending at least one received frame with the at least one generated synthesized frame to form the long exposure image; and
providing the long exposure image as output.

15. The method of claim 14, wherein the plurality of arriving frames are obtained from a previously stored video file.

16. The method of claim 14, wherein the indication is received from a user.

17. The method of claim 16, wherein the indication is received in response to making a recommendation to the user that the long exposure image should incorporate the one or more synthesized frames.

18. The method of claim 14, wherein the indication is received in response to applying a set of heuristics to a set of image capture environment information.

19. The method of claim 14, wherein the indication is received in response to applying an additional trained model to a set of image capture environment information.

20. The method of claim 14, wherein the indication is received in response to a determination of a scene associated with the video stream data.

21. The method of claim 14, wherein the indication is received in response to an optical flow analysis.

22. The method of claim 21, wherein the optical flow analysis is performed using a set of reduced resolution thumbnail images.

23. The method of claim 14, wherein generating the at least one synthesized frame includes applying a video smoothing technique.

24. The method of claim 14, wherein generating the at least one synthesized frame includes using an optical flow.

25. The method of claim 14, wherein the set of other long exposure images incorporate one or more other synthesized frames.

26. The method of claim 14, further comprising generating a recommendation to a user to employ the one or more synthesized frames in creating the long exposure image.

27. A computer program product embodied in a non-transitory computer readable medium and comprising computer instructions for:
receiving, in response to calling a video capture application programming interface (API) of a device, video stream data, wherein the video stream data comprises a plurality of arriving frames captured as video data during a video recording operation of the device;
receiving an indication that the received video stream data should be processed into a long exposure image that incorporates one or more synthesized frames;
using a set of frames including at least one arriving frame to generate at least one synthesized frame, including by using a model trained based at least in part on a set of other long exposure images;
blending at least one received frame with the at least one generated synthesized frame to form the long exposure image; and
providing the long exposure image as output.

* * * * *